A. CANFIELD.
LICENSE TAG.
APPLICATION FILED OCT. 25, 1916.
1,249,024.
Patented Dec. 4, 1917.
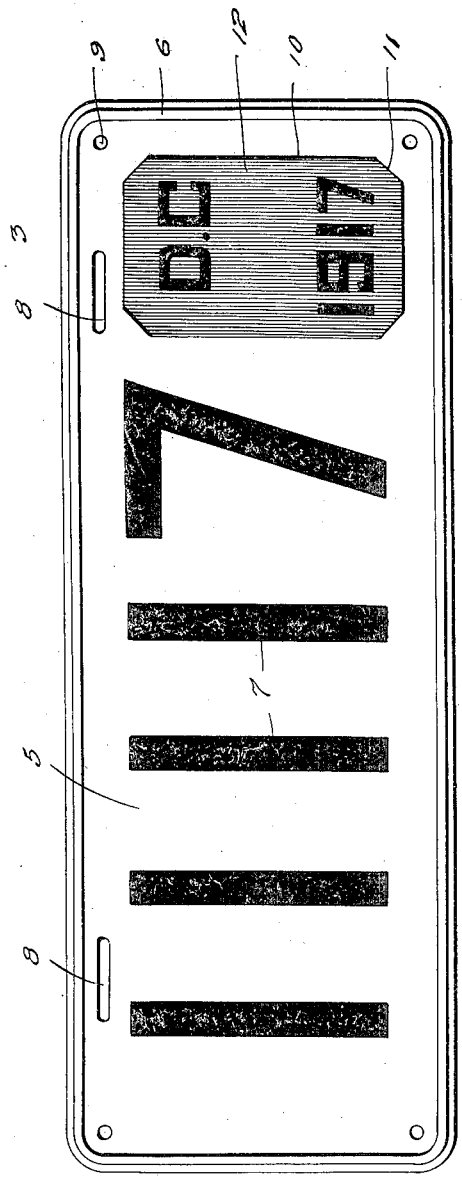
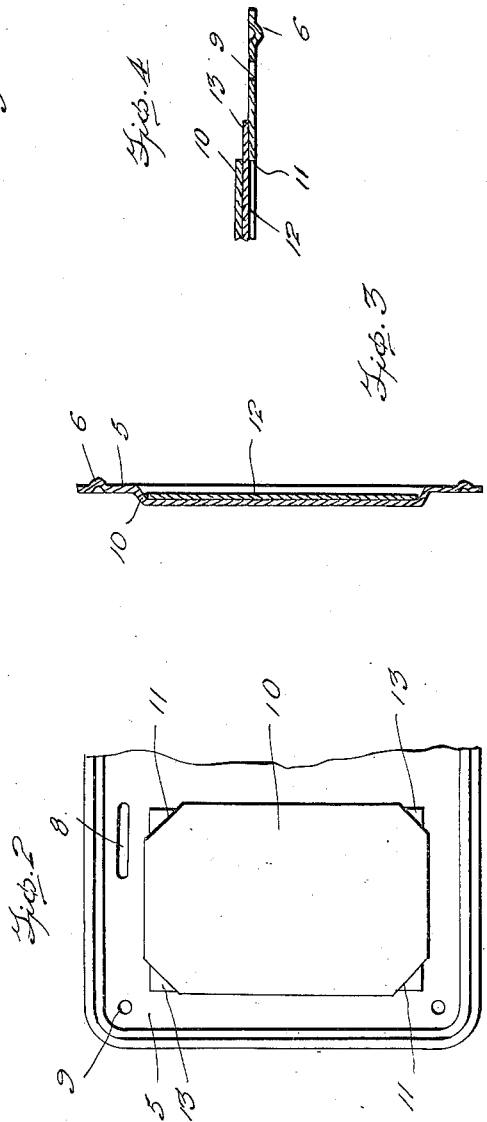
Inventor
A. Canfield.
By John Louis Waters & Co
Attorneys

UNITED STATES PATENT OFFICE.

ALFRED CANFIELD, OF TECUMSEH, NEBRASKA.

LICENSE-TAG.

1,249,024.   Specification of Letters Patent.   Patented Dec. 4, 1917.

Application filed October 25, 1916. Serial No. 127,527.

*To all whom it may concern:*

Be it known that I, ALFRED CANFIELD, a citizen of the United States, residing at Tecumseh, in the county of Johnson and State of Nebraska, have invented certain useful Improvements in License-Tags, of which the following is a specification, reference being had therein to the accompanying drawing.

The invention relates to tags and more particularly to the class of license tags or plates for vehicles, automobiles or the like.

The primary object of the invention is the provision of a tag or plate of this character wherein a changeable dial is removably supported by the same so that the date of issuance of the license, as usually permanently indicated upon the tag or plate, can be changed or altered in a convenient manner with despatch.

Another object of the invention is the provision of a tag or plate of the character described wherein the construction thereof permits the interchanging of indicia by reason of the removable mounting of a section or plate thereon, thereby rendering the license tag or plate capable of disclosing the correct license data renewed from year to year and the disclosure of the renewal date thereof.

A further object of the invention is the provision of a tag or plate of this character which is simple in construction, possessing few parts, thoroughly reliable and efficient in its purpose, strong, durable and inexpensive in manufacture.

With these and other objects in view the invention consists in the features of construction, combination of elements, and arrangement of parts as will be hereinafter fully described, illustrated in the accompanying drawing, and pointed out in the claim hereunto appended.

In the accompanying drawing:

Figure 1 is a plan view of a license tag or plate constructed in accordance with the invention.

Fig. 2 is a fragmentary rear elevation thereof.

Fig. 3 is a sectional view on the line 3—3 of Fig. 1.

Fig. 4 is a fragmentary diagonal sectional view from one corner of the license tag or plate.

Similar reference characters indicate corresponding parts throughout the several views in the drawing.

Referring to the drawing in detail the license tag comprises a rectangular shape plate 5 preferably made from metal which inner marginal edge thereof is struck outwardly to form a bead 6 presenting a border or frame, while struck outwardly from the said plate 5 within the border formed by the bead 6 is a series of numbers 7 or other indicia indicative of the license number issued to the user of the tag. These numbers 7, on their raised faces, are suitably colored to make the same readily distinguishable from the surface of the plate 5 thereby enabling the license number to be clearly visible to an observer. The plate 5 near one longer edge is provided with slots 8 for accommodating straps or other hangers for the fastening of the plate upon a vehicle, automobile or the like. Also the plate 5 near its corners are provided with holes 9 through which can be passed suitable fasteners for securing the plate in position in lieu of straps or hangers.

The plate 5 at one side of the series of numerals 7 is depressed to form a counterseat 10 preferably of substantially rectangular shape with diagonal slits 11 adjacent the corners thereof and within this counterseat is adapted to be removably placed a section or plate 12 which is of substantially corresponding size to the counterseat and of substantially rectangular shape, the corners 13 of the section or plate 12 being inserted in the slots 8, as the plate is preferably made from metal, such corners 13 being readily inserted as above stated for the detachable fastening of the section or plate 12 within the counterseat 10 in the plate 5 and upon the outer exposed face of this section or plate 12 is a coating of coloring matter for distinguishing the same from the numerals 7 constituting the license number upon the plate 5 and in addition the said section or plate 12 has painted or otherwise marked thereon suitable indicia indicative of the year the license is given to the operator of the vehicle, automobile or the like or other information.

The section or plate 12 is readily removable to permit the mounting of a substitute section or plate for the changing of the indicia or other data in accordance with the renewal or changing of the license issued to the operator of the vehicle, automobile or the like.

From the foregoing it is thought that the construction and manner of use of the license tag will be clearly understood and therefore a more extended explanation has been omitted.

What is claimed is:

In a device of the class described in combination, a rectangular shaped plate, said plate being formed with a depressed portion formed parallel with said plate and having four side walls bridging and connecting said depressed portion to said plate, said side walls inclining across from said plate to the back wall of said depressed portion, said side walls of said depressed portion at its four corners being cut away to provide diagonal walls forming spaces between said depressed portion and the plate proper.

In testimony whereof I affix my signature.

ALFRED CANFIELD.